United States Patent
Hessling

(10) Patent No.: US 8,956,021 B2
(45) Date of Patent: Feb. 17, 2015

(54) AIRCRAFT LIGHT

(71) Applicant: Andre Hessling, Koblenz (DE)

(72) Inventor: Andre Hessling, Koblenz (DE)

(73) Assignee: Goodrich Lighting Systems GmbH (DE)

(*) Notice: Subject to any disclaimer, the term of this patent is extended or adjusted under 35 U.S.C. 154(b) by 140 days.

(21) Appl. No.: 13/626,510

(22) Filed: Sep. 25, 2012

(65) Prior Publication Data

US 2013/0077331 A1 Mar. 28, 2013

(30) Foreign Application Priority Data

Sep. 26, 2011 (EP) .................................... 11182768

(51) Int. Cl.
| | | |
|---|---|---|
| *B64D 47/02* | (2006.01) | |
| *B64F 1/20* | (2006.01) | |
| *F21V 1/20* | (2006.01) | |
| *F21V 21/00* | (2006.01) | |
| *F21S 8/10* | (2006.01) | |
| *B64D 47/06* | (2006.01) | |

(52) U.S. Cl.
CPC ................ *F21S 48/32* (2013.01); *B64D 47/06* (2013.01); *B64D 2203/00* (2013.01)
USPC ...... 362/470; 362/373; 362/249.02; 362/294; 362/218; 313/11; 313/13; 313/46

(58) Field of Classification Search
CPC ..... F21V 29/22; F21V 29/2293; F21V 21/00; F21V 29/26; F21V 13/04; F21V 29/2262; F21V 29/00; F21V 23/009; F21K 9/00; F21K 9/1355; F21K 9/1375; F21K 9/175; B60Q 1/04

USPC ........... 313/11, 13, 46; 362/470, 373, 249.02, 362/84, 294, 218
See application file for complete search history.

(56) References Cited

U.S. PATENT DOCUMENTS

| | | | |
|---|---|---|---|
| 4,273,183 A | 6/1981 | Altoz | |
| 6,829,145 B1 | 12/2004 | Corrado | |
| 7,308,008 B2 | 12/2007 | Freeman et al. | |
| 2002/0114136 A1 | 8/2002 | Cardenas | |
| 2003/0076565 A1 | 4/2003 | Noda et al. | |
| 2006/0018123 A1* | 1/2006 | Rose | 362/341 |
| 2006/0044823 A1* | 3/2006 | Wong et al. | 362/573 |

(Continued)

FOREIGN PATENT DOCUMENTS

| | | |
|---|---|---|
| DE | 19537633 A1 | 4/1997 |
| DE | 202007008221 U1 | 10/2007 |

(Continued)

OTHER PUBLICATIONS

European Search Report for application No. 11182768.9-2422, Mailed Feb. 23, 2012, 4 pages.

*Primary Examiner* — Anh Mai
*Assistant Examiner* — Kevin Quarterman
(74) *Attorney, Agent, or Firm* — Cantor Colburn LLP

(57) ABSTRACT

An aircraft light consists of a housing containing a light source, a heat sink element forming at least part of the exterior surface of the housing and an auxiliary thermal capacitor that is thermally decoupled from the heat sink element. A thermally expandable medium is coupled to the heat sink element and operates to thermally decouple the light source from the heat sink element and thermally couple the light source to the auxiliary thermal capacitor and vice versa, depending on the actual temperature of the heat sink element.

8 Claims, 2 Drawing Sheets

(56) References Cited

U.S. PATENT DOCUMENTS

2010/0177514 A1* 7/2010 Liu et al. .................. 362/235
2011/0121705 A1   5/2011 Bancken
2011/0228529 A1* 9/2011 Patel et al. ................ 362/235
2012/0314432 A1* 12/2012 Moriyama et al. ......... 362/382

FOREIGN PATENT DOCUMENTS

| DE | 102006037747 A1 | 3/2008 |
| EP | 0852398 A1 | 7/1998 |
| EP | 1009079 A1 | 6/2000 |
| EP | 2315285 B1 | 4/2011 |

* cited by examiner

AIRCRAFT LIGHT

BACKGROUND OF THE INVENTION

The present invention relates to an aircraft light which can withstand temporary extreme thermal peak loads.

DESCRIPTION OF THE PRIOR ART

Typically, an aircraft light comprises a housing and at least one light source located within the housing for emitting light. High intensity light sources can be rather sensitive to thermal loads so that heat generated upon operation of the light sources has to be dissipated. To this end, an aircraft light typically comprises a heat sink element for cooling the at least one light source. Part of the heat sink element forms at least a portion of the outer side of the housing which is exposed to the environment around the light in order to dissipate heat into this environment.

This type of cooling concept is designed for cases in which the environment around the heat sink element can still receive thermal energy dissipated from the heat sink element. However, if the environment around the heat sink element for whatever reasons is overheated, the heat sink element cannot be used to transfer heat from the heat sink element to the environment. Depending on the time period for which these conditions last, this can result in a thermal distortion of the light sources.

Mechanical heat transfer devices according to different constructions are known from U.S. Pat. No. 4,273,183; U.S. Pat. No. 6,829,145 and EP-A-2 315 285.

SUMMARY OF THE INVENTION

Accordingly, it is an object of the present invention to overcome the above-identified disadvantages and to design an aircraft light in which also in temporary extreme thermal environmental conditions the at least one light source can be sufficiently cooled in order to prevent a distortion or degradation of the at least one light source.

To this end, the present invention provides an aircraft light comprising a housing having an outer side, at least one light source located within the housing for emitting light, a heat sink element for cooling the at least one light source, wherein at least a portion of the heat sink element forms at least a portion of the outer side of the housing, an auxiliary thermal capacitor for receiving thermal energy from the at least one light source, wherein the auxiliary thermal capacitor is thermally decoupled from the heat sink element, and actuator means thermally coupled to the heat sink element and operable to thermally decouple the at least one light source from the heat sink element and thermally couple the at least one light source to the auxiliary thermal capacitor and vice versa, depending on the actual temperature of the heat sink element becoming higher or lower than a threshold value, wherein the actuator means comprises a volume of a thermally expandable medium for displacing the at least one light source out of thermal coupling to the heat sink element and towards thermal coupling to the auxiliary thermal capacitor.

The present invention solves the above-identified issue by thermally decoupling the at least one light source from the heat sink element during the time of an external extreme thermal energy input to the heat sink element. Thermal decoupling is performed with the aid of an actuator means which is thermally operated automatically in order to displace the at least one light source out of thermal coupling to the heat sink element and into thermal coupling to an internal auxiliary thermal capacitor for receiving thermal energy from the at least one light source. The auxiliary thermal capacitor is thermally decoupled from the heat sink element. The actuator means comprises a volume of a thermally expandable medium for displacing the at least one light source out of thermal coupling to the heat sink element and towards thermal coupling to the auxiliary thermal capacitor and vice versa, depending on the actual temperature of the heat sink element becoming higher or lower than a threshold value. Accordingly, during the period of time in which the at least one light source is thermally decoupled from the heat sink element, the self-induced thermal energy from the at least one light source is buffered in the auxiliary internal thermal capacitor until the housing and, in particular, the heat sink element forming at least a part of the outer side of the housing, is cooled off again. At this time the thermally expandable medium no longer is expanded so that the at least one light source again becomes thermally decoupled from the auxiliary thermal capacitor and thermally coupled to the heat sink element. Also a discharge of the thermal capacitor to the housing (and, if necessary, the heat sink element) takes place again so that the auxiliary thermal capacitor is ready again for receiving thermal energy from the at least one light source in case that the heat sink element is exposed to external thermal energy inputs.

The structure according to the invention can also be described as a smart thermal switch that couples and decouples the at least one temperature-sensitive light source in the manner of a dual clutch. If the exterior housing and exterior heat sink element portion get too hot, the energy path from the at least one light source is decoupled from the heat sink element and coupled to the inner thermal capacitor. This process is reversible and occurs once the exterior housing or heat sink element portion is cooling off again.

The feature of selectively thermally coupling an electronic device (e.g. circuitry or elements) to a heat sink is basically known from U.S. Pat. No. 7,308,008, US-A-2003/0076565, US-A-2002/0114136, EP-B-1 009 079, EP-A-0 852 398, DE-B-10 2006 037 747, DE-A-195 37 633 and DE-U-20 2007 008 221.

However, what is not known from the prior art is thermally decoupling a thermal heat generating element from its associated heat sink element if the same itself is exposed to external thermal energy inputs, and thermally coupling the heat generating element to an auxiliary thermal capacitor thermally decoupled from the heat sink element.

In one aspect of the present invention, the thermally expandable medium can be a wax and/or can be encompassed by an elastic enclosure. The elastic enclosure can further be fixed to the at least one light source or an intermediate element to which the at least one light source is mounted. In this embodiment, the light source is moved back and forth depending on the actual degree of expansion of the thermally expandable medium.

In another embodiment of the present invention the thermally expandable medium is in mechanical contact with the at least one light source or an intermediate element to which the at least one light source is mounted, wherein the actuator means comprises a resilient element for displacing the at least one light source for thermally decoupling it from the auxiliary thermal capacitor and for thermally coupling it with the heat sink element. The resilient element can be a spring element or the like elastically deformable element.

According to a further aspect of the present invention, the heat sink element comprises a contact side for thermally contacting the at least one light source or an intermediate element to which the at least one light source is mounted, wherein the contact side of the heat sink element comprises a recess accommodating the thermally expandable medium.

Finally, in a further embodiment according to the invention, a plurality of light sources are provided and mounted to a support element acting as an intermediate element for transmitting heat energy from the light sources to the heat sink element as long as in thermal contact with the same or from the light sources to the auxiliary thermal capacitor as long as in thermal contact therewith.

BRIEF DESCRIPTION OF THE DRAWINGS

A full and enabling disclosure of the present invention, including the best mode thereof, enabling one of the ordinary skill in the art to carry out the invention, is set forth in greater detail in the following description, including reference to the accompanying drawing in which.

DESCRIPTION ON A PREFERRED EMBODIMENT

Figure 1:
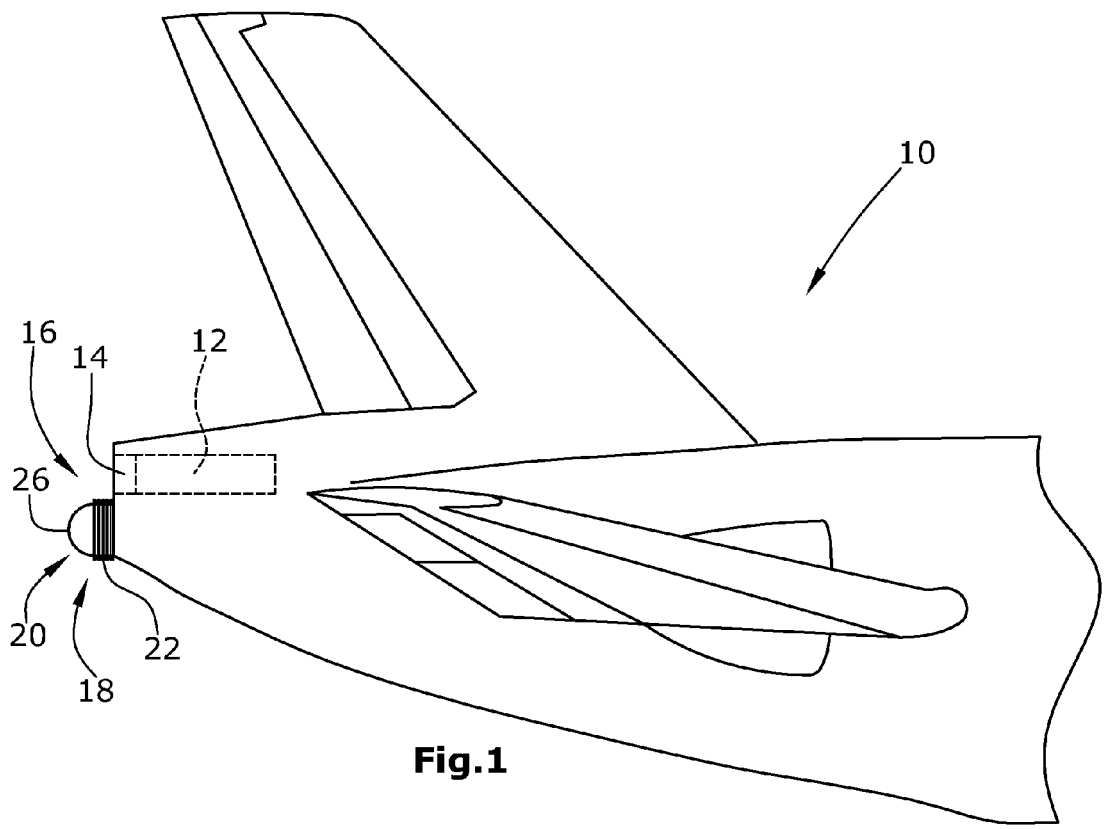
FIG. 1 illustrates an example showing a possible application of the present invention in an aircraft in which the aircraft light is used as an aircraft tail light arranged in close vicinity to the outlet of an auxiliary power unit (APU) of the aircraft.

FIG. 1 shows the tail portion of an aircraft 10 comprising an auxiliary power unit (APU) 12 having an outlet 14 located at the tail end 16 of the aircraft 10. In the vicinity of the APU outlet 14, there is arranged an external aircraft light 18 used as tail light in this embodiment. The aircraft light 18 comprises a housing 20 formed at least in part by a portion 22 of a heat sink element 24 and a transparent cover 26. The aircraft light 18 is shown in more detail in the cross-sectional views of FIGS. 1 and 2.

The portion 22 of the heat sink element 24 exposed to the environment around the aircraft light 18 is used to dissipate thermal energy from the heat sink element 24 to the environment. However, if the heat sink element is exposed to external thermal inputs, unfortunately it can no longer serve as a heat dissipating element. This can happen e.g. if the exhaust gas of the APU 12 due to the actual wind conditions are directed (back) towards the heat sink element portion 22. Also in this condition, the light sources of the aircraft light 18 have to be effectively cooled to avoid degradation or in the extreme case distortion.

Figure 2:
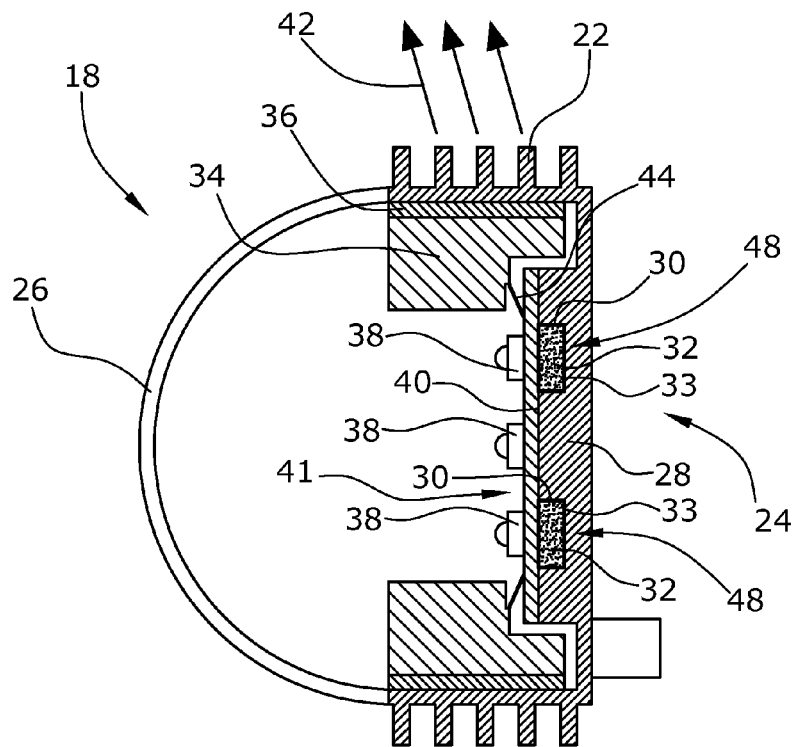
FIG. 2 is a cross-sectional view of the aircraft light according to FIG. 1 and in an operational condition in which the light sources are cooled by a heat sink element forming at least a portion of the outer side of the aircraft light housing.
Figure 3:
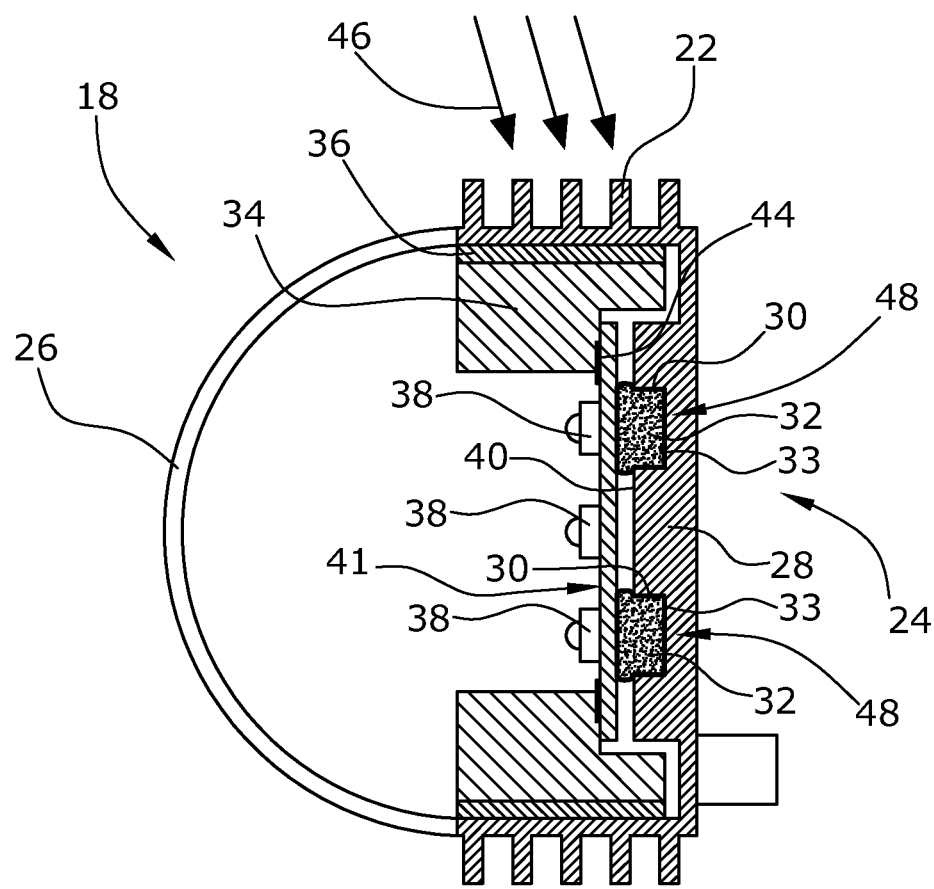
FIG. 3 is a cross-sectional view of the aircraft light in the condition in which the light sources are thermally decoupled from the heat sink element and are thermally coupled to an internal auxiliary thermal capacitor.

The construction of the aircraft light 18 is shown in more detail in FIGS. 2 and 3. The heat sink element 24 comprises the portion 22 as well as another portion 28 as shown in FIGS. 1 and 2. This other plate-like portion 28 which also can have other geometric configurations, is provided with at least one recess 30 (in this embodiment there are two recesses 30) filled by a thermally expandable medium 32 which e.g. can be a wax. The thermally expandable medium 32 is included in an elastic envelope or enclosure 33.

Arranged within the housing 20 of the aircraft light 18 is an auxiliary thermal capacitor 34 which is thermally decoupled from the heat sink element 24. To this end, the auxiliary thermal capacitor 34 is located spaced apart from the heat sink element 24 so that a gap exists between both which can be filled by an insulator 36.

Finally, the aircraft light 18 also comprises at least one light source 38, which in this embodiment can be formed by an LED. In this embodiment according to FIGS. 2 and 3, a plurality of light sources 38, i.e. a plurality of LEDs is provided. These light sources 38 are mounted to a common support 40 which in this embodiment is designed as a printed circuit board layer. The support 40 under normal thermal conditions is in contact with the heat sink element portion 28 so that the light sources 38 are thermally coupled to the heat sink element 24.

FIG. 2 shows the operational situation of the aircraft light 18 under normal thermal conditions in which the heat sink element 24 is used to dissipate thermal energy from the light sources 38 via the heat sink element portion 22 to the environment (see heat flow arrows 42 in FIG. 2). The support 40 of the light sources 38 is in thermal (and mechanical) contact with the heat sink element 24 as shown in FIG. 2. The support 40 can be regarded as an intermediate element 41 for thermally coupling the light sources 38 to the heat sink element 24 (and, if necessary, to the thermal capacitor 34). A resilient element 44 (spring or the like) is used so as to push the support 40 against the heat sink element portion 22.

FIG. 3 shows the situation in which the heat sink element portion 22 is exposed to an external thermal energy input (see the heat flow arrows 46 in FIG. 3). Due to the external heat energy input, the heat sink element 24 is heated up to an extent beyond a threshold value beyond which the support 40 is displaced from the heat sink element 24 towards thermal contact with the auxiliary thermal capacitor 34. This is performed with the aid of the heat expandable medium 32 which under the influence of the increased temperatures expands and thereby pushes the support 40 against the spring biasing force of the resilient element 44 into thermal contact with the auxiliary thermal capacitor 34. Now the self-induced heat energy of the light sources 38 is received by the auxiliary thermal capacitor 34, resulting in a cooling effect to the light sources 38.

After a certain period of time when the external heat energy input does no longer exist, the heat sink element 24 cools off and the expandable medium 32 contracts so that the support 40 is urged again against the heat sink element 24 by means of the resilient element 44. Accordingly, in this condition the situation as shown in FIG. 2 applies.

The volume of the thermally expandable medium 32 (with or without the elastic envelope or enclosure 33) described above can be regarded as a thermal actuator means acting as a thermal switch for thermally coupling and decoupling the light sources 28 in a dual clutch way.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. For example, the aircraft light typically can be provided with a unit connector which is not shown in detail in the above-mentioned Figures. Also, in these Figures the wiring is not shown in detail. Finally, in this embodiment the use of the aircraft light as a tail light is described. It is self-explanatory that also other applications of the aircraft light (both external and internal) are possible. It is also clear that there are a plurality of embodiments in which the principles of the invention can be used in that all of them can use the thermal actuator as described above in which a volumetric extension of a thermally expandable material within the actuator leads to a relative movement of a component to be cooled out of thermal coupling to an external heat sink element and into thermal coupling to an inner auxiliary thermal capacitor. The actuator is thermally coupled to the exterior heat sink element. A robust approach for using the invention in an aircraft light is described above in connection with the Figures because in this embodiment the masses and movements are reduced to a relatively small amount and configuration.

The invention claimed is:

1. Aircraft light comprising a housing (20) having an outer side, at least one light source (38) located within the housing (20) for emitting light, a heat sink element (24) for cooling the at least one light source (38), wherein at least a portion (22) of the heat sink element (24) forms at least a portion of the outer side of the housing (20), an auxiliary thermal capacitor (34) for receiving thermal energy from the at least one light source (38), wherein the auxiliary thermal capacitor (34) is thermally decoupled from the heat sink element (24), and actuator means (48) thermally coupled to the heat sink element (24) and operable to thermally decouple the at least one light source (38) from the heat sink element (24) and thermally couple the at least one light source (38) to the auxiliary thermal capacitor (34) when the actual temperature of the heat sink element (24) exceeds a threshold value, wherein the actuator means (48) comprises a volume of a thermally expandable medium (32) for displacing the at least one light source (38) out of thermal coupling to the heat sink element (24) and towards thermal coupling to the auxiliary thermal capacitor (34).

2. Aircraft light according to claim 1, wherein the thermally expandable medium (32) is a wax.

3. Aircraft light according to claim 1, wherein the thermally expandable medium (32) is enclosed by an elastic enclosure (33).

4. Aircraft light according to claim 3, wherein the expandable enclosure (33) is fixed to the at least one light source (38) or an intermediate element (41) to which the at least one light source (38) is mounted.

5. Aircraft light according to claim 1, wherein the thermally expandable medium (32) is in mechanical contact with the at least one light source (38) or an intermediate element (41) to which the at least one light source (38) is mounted, and wherein the actuator means (48) comprises a resilient element for displacing the at least one light source (38) for thermally decoupling it from the auxiliary thermal capacitor (34) and for thermally coupling it with the heat sink element (24).

6. Aircraft light according to claim 1, wherein the heat sink element (24) comprises a contact side for thermally contacting the at least one light source (38) or an intermediate element (41) to which the at least one light source (38) is mounted, and wherein the contact side of the heat sink element (24) comprises a recess accommodating the thermally expandable medium (32).

7. Aircraft light according to claim 1, wherein a plurality of light sources (38) are provided and mounted to a support element acting as an intermediate element (41) for transmitting heat energy from the light sources (38) to the heat sink element (24) as long as in thermal contact with the same or from the light sources (38) to the auxiliary thermal capacitor (34) as long as in thermal contact therewith.

8. Aircraft light according to claim 1, wherein the at least one light source (38) is an LED.

* * * * *